Dec. 16, 1958 R. W. PETER 2,864,944

TWO WAY RADIO RELAY SYSTEM INCLUDING TRAVELING WAVE TUBES

Filed May 18, 1954

INVENTOR.
ROLF W. PETER

BY
Charles H. Brown
ATTORNEY

United States Patent Office 2,864,944
Patented Dec. 16, 1958

2,864,944

TWO WAY RADIO RELAY SYSTEM INCLUDING TRAVELING WAVE TUBES

Rolf W. Peter, Cranbury, N. J., assignor to Radio Corporation of America, a corporation of Delaware Application May 18, 1954, Serial No. 430,660

The terminal fifteen years of the term of the patent to be granted has been disclaimed 2 Claims. (Cl. 250—15)

This invention relates to radio relay systems including traveling wave tubes, and more particularly, to a two-direction radio relay terminal in which the signals going in both directions are passed thru a single path including traveling wave tube amplifiers.

Microwave radio relay stations are known which receive a signal of one frequency range from one direction, amplify the signal, translate the signal to another frequency range, and transmit it in the other direction. The frequency translation is performed, inter alia, to prevent a tendency toward oscillation caused by feed-back from the transmitting antenna to the receiving antenna. If the relay station is required to simultaneously handle messages going in both directions, it has been necessary to provide two complete equipments, one for messages in one direction, and the other for messages in the other direction. It is a general object of this invention to provide an improved radio relay station wherein the signals simultaneously going in both directions are both amplified in a single traveling wave tube amplifying circuit.

The copending but now abandoned application of Frank R. Arams, Serial No. 402,691, filed on January 7, 1954, entitled "Traveling Wave Tube System," and assigned to the assignee of this application, teaches a system for increasing the amplification provided by a traveling wave tube by passing the signal thru the tube, heterodyning the amplified output signal to a slightly different frequency range, and then passing the signal thru the tube again. By this arrangement, a single traveling wave tube can be made to provide substantially double the gain that would otherwise be possible. The present invention differs from that of the above-identified application in that two different message signals are simultaneously amplified in a common traveling wave tube amplifier, the two signals being such as to occupy different frequency ranges so that they do not interfere with one another in the traveling wave tube. It is therefore another object of this invention to provide an improved system for simultaneously amplifying two different signals in a single traveling wave tube amplifier.

The traveling wave tube amplifier of this invention may include a plurality of traveling wave tube circuits coupled in cascade. It is a characteristic of traveling wave tubes that a tube of one design is most useful in amplifying a low level signal in such a way as to discriminate against noise. The same traveling wave tube may be employed with different bias potentials as a high gain or intermediate level amplifier. A traveling wave tube of a second design is most useful as a power amplifier. The low noise traveling wave tube and the high gain traveling wave tube are normally operated as linear amplifiers, and the power traveling wave tube is operated over a range including the non-linear portion of the characteristic curve so as to maximize the power output. So long as a traveling wave tube is operated on the linear portion of its characteristic curve, there is little danger that two signals simultaneously being amplified by the tube will interfere with each other to cause cross-modulation. The danger of cross-modulation is further reduced if the levels of the two signals simultaneously amplified in the traveling wave tube are of equal value. It is therefore a further object of this invention to provide an improved system for simultaneously amplifying two different signals in a single traveling wave tube in such a way as to minimize the interference between the two signals.

It is a still further object to provide an improved two-direction radio relay station characterized in requiring a minimum number of traveling wave tubes by reason of an arrangement whereby traveling wave tubes are employed to simultaneously amplify the signals going in both directions.

In one aspect, the invention comprises a radio relay station including antennas whereby message signals of different frequency ranges are simultaneously received from the West and from the East. The terms West and East are used for convenience to identify any two directions. Both received signals are applied to the input of a first traveling wave tube amplifier circuit. The output of the amplifier circuit and the output of a local oscillator are both applied to a mixer. The heterodyned output of the mixer is passed thru a filter to eliminate all frequencies except the sum or difference frequencies. The output of the filter is then applied to a second traveling wave tube amplifier circuit. The heterodyned signals in the output of the second traveling wave tube amplifier circuit are separated by filter means. One signal is applied to an antenna directed towards the East and the other signal is applied to an antenna directed towards the West. The West-going and the East-going signals may be separately amplified in separate power traveling wave tube circuits prior to application to the respective antennas. The West-going and the East-going signals are at substantially the same power level in the first traveling wave tube amplifier circuit, and are also at substantially the same level in the second traveling wave tube amplifier circuit. By this arrangement whereby the two signals simultaneously amplified in a traveling wave tube circuit are at substantially the same level, the amplification is performed substantially without interference or cross-modulation between the two signals. One directional antenna pointed in a given direction may be used for receiving and another directional antenna pointed in the same direction may be used for transmitting; or a single antenna pointed in a given direction may be employed for both transmitting and receiving in conjunction with a diplexing network.

These and other objects and aspects of the invention will be apparent to those skilled in the art from the following more detailed description of the invention, taken together with the appended drawings, wherein.

Figure 1:
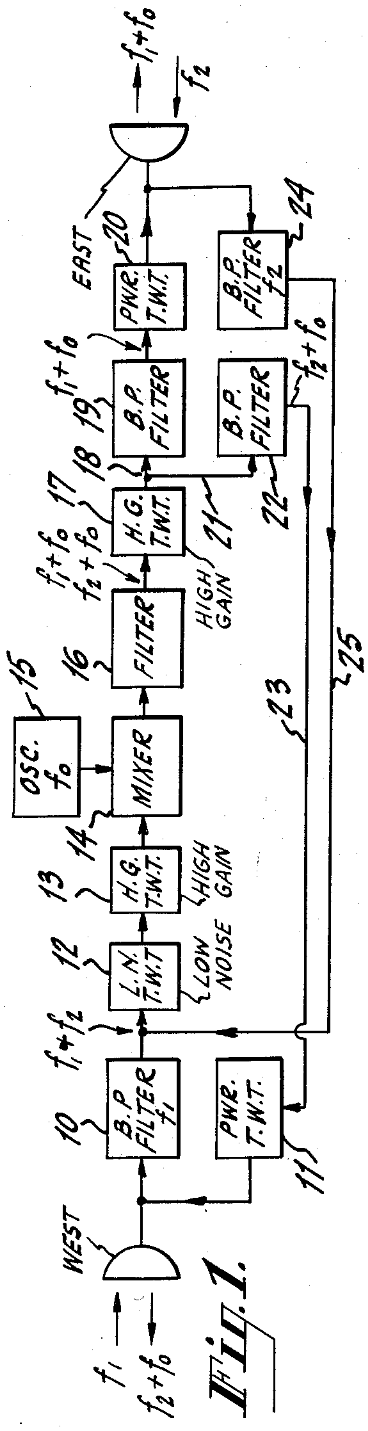
Figure 1 is a block diagram of a two-directional radio relay station constructed according to the teachings of this invention.

Referring to the radio relay system of Figure 1, a directional antenna West is coupled to the input of a bandpass filter 10 and to the output of a power traveling wave tube amplifier circuit 11. The output of bandpass filter 10 is coupled thru a low-noise (L. N.) traveling wave tube amplifier circuit 12 and a high gain (H. G.) traveling wave tube amplifier circuit 13 to a mixer 14. The mixer 14 may be a crystal mixer or, alternatively, the traveling wave tube amplifier 13 may be employed as a mixer. In either case, a loss of about 6 db is suffered in the mixing operation.

A local oscillator 15 has an output coupled to the mixer 14. Oscillator 15 may be of any suitable circuit configuration, and may include a klystron tube or a voltage-tunable backward-wave oscillator tube. The sum and difference frequencies from mixer 14 are applied thru a bandpass filter 16 to a second high gain traveling wave tube amplifier 17. The output of the traveling wave tube amplifier 17 is applied over line 18 thru a bandpass filter 19 and thru a power traveling wave tube amplifier circuit 20 to a directional antenna East. The output of the traveling wave tube amplifier circuit 17 is also applied over line 21, thru bandpass filter 22, over line 23, and thru a power traveling wave tube amplifier circuit 11 to the directional antenna West. The directional antenna East is coupled thru a bandpass filter 24 and a line 25 to the input of low noise traveling wave tube amplifier circuit 12.

A description of low-noise traveling wave tube amplifiers and traveling wave tube power amplifiers may be obtained from many publications, including an article entitled "New Developments in Traveling-Wave Tubes," by W. J. Dodds, R. W. Peter, and S. F. Kaisel, appearing at pages 130–133 of the February 1953 issue of Electronics magazine.

Figure 3:
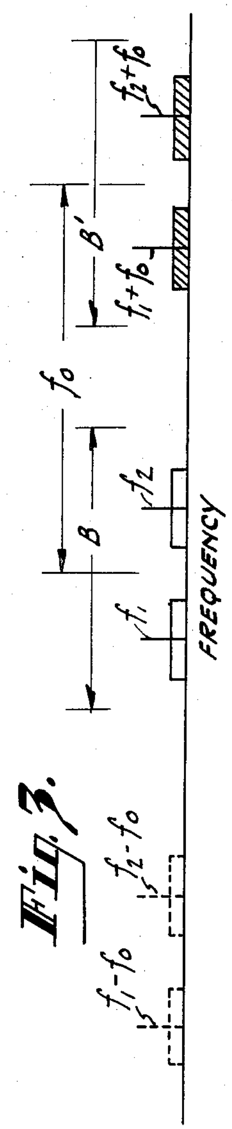
Figure 3 is a chart showing frequency relationships which will be referred to in explaining the operation of the circuits of Figures 1 and 2.

The operation of the radio relay station of Figure 1 will now be described with reference to the frequency chart of Figure 3. The message signal received from the West consists of a radio frequency carrier frequency $f_1$ modulated by the intelligence signal. In Figure 3, the carrier frequency $f_1$ is represented by a vertical line, and sidebands are represented as extending on both sides of the carrier frequency. For convenience, the message modulated radio frequency signal including the sidebands will be referred to as the signal $f_1$. Similarly, a message modulated radio frequency signal $f_2$ is received by the antenna East. It will be noted from Figure 3 that the signals $f_1$ and $f_2$ occupy different frequency ranges. Radio relay stations normally operate with received and transmitted signals of frequencies displaced from each other. The signal $f_1$ received from the West is applied thru bandpass filter 10 to the input of the traveling wave tube circuit 12, and the signal $f_2$ received from the East is applied thru bandpass filter 24 and then also to the input of traveling wave tube circuit 12. Both signals are amplified simultaneously in the low-noise traveling wave tube amplifier 12 and also in the high gain traveling wave tube amplifier 13. The amplifier circuits 12 and 13 are characterized in being able to amplify frequency components over a range B of Figure 3, without distortion and cross-modulation.

The two amplified signals $f_1$ and $f_2$ from the traveling wave tube amplifier circuit 13 are now applied to the mixer 14, where they are heterodyned with a signal at frequency $f_0$ from the local oscillator 15. The output of the mixer 14 is applied to bandpass filter 16, which passes the sum frequencies $f_1+f_0$ and $f_2+f_0$, but blocks the original frequencies and the difference frequencies. The sum frequencies from the bandpass filter 16 are then amplified in the high gain traveling wave tube amplifier circuit 17. The amplifier circuit 17 is adapted to amplify all frequencies in the range B′ of Figure 3 without distortion. The high gain traveling wave tube amplifier circuit 17 may be exactly the same as the circuit 13, and the shift in the center frequency of the frequency band amplified may be accomplished by merely adjusting the potential applied to the helical electrode in the traveling wave tube.

The two signals in the output of the circuit 17 are separated by means of bandpass filters 19 and 22. The signal $f_1+f_0$ from filter 19 is applied thru a power (PWR) traveling wave tube amplifier 20 to the directional antenna East from which it is radiated to the next distant relay station in the direction East. The signal $f_2+f_0$ from the filter 22 is applied thru the power traveling wave tube amplifier circuit 11 to the directional antenna West from which it is transmitted to the next distant radio relay station in the direction West. Filter 10 prevents the signal $f_2+f_0$ from returning to traveling wave tube 12. The terms East and West, as stated before, are merely used to distinguish between the two directions which may be any two directions.

It will be noted that the signal received from the East and the signal received from the West are both simultaneously amplified in traveling wave tube amplifier circuits 12, 13 and 17. It will be further noted that the level of these two signals in the three traveling wave tube amplifier circuits is substantially the same in each of the three circuits. Since the two signals in a given circuit are at substantially the same level, there is substantially no cross-modulation between the two signals, if the amplifier is operating in a substantially linear region. Any cross-modulation products are far below the level of both signals. The East-going signal is individually amplified in power amplifier 20, and the West-going signal is individually amplified in power amplifier 11. The amplification of both signals in a single power amplifier is not attempted for the reason that the power amplifiers operate on the non-linear portion of the characteristic curve in order to provide the greatest power gain, and under these conditions two signals going thru the same traveling wave tube would modulate each other and cause cross-talk and interference between the two signals. Additionally, it is preferable for each signal to fully utilize the power handling capacity of a separate tube in the final amplifying stage. The traveling wave tube circuits 12, 13, and 17 in the common path, however, operate on the linear portion of their characteristic curves, and therefore there is no cross-modulation of the two signals.

By way of example to illustrate frequencies which may be employed in the system, a very high quality television signal relay station may employ frequencies wherein $f_1$=6,000 megacycles, $f_2$=6,040 megacycles and $f_0$=120 megacycles. Then $f_1+f_0$=6,120 megacycles and $f_2+f_0$=6,160 megacycles. It will be noted from the chart of Figure 3 that the local oscillator frequency $f_0$ should be somewhat greater than the bandwidth B or B′ of the two signals simultaneously amplified in a single amplifier circuit, to prevent overlapping of the original signals and the heterodyned signals.

Of course, the system may be arranged to utilize the difference frequencies $f_1-f_0$ and $f_2-f_0$, in place of the sum frequencies. In any case, the system utilizes one set of the sum and difference frequencies. The set used may be the sum frequencies, the difference frequencies, or one sum frequency and one difference frequency.

Figure 2:
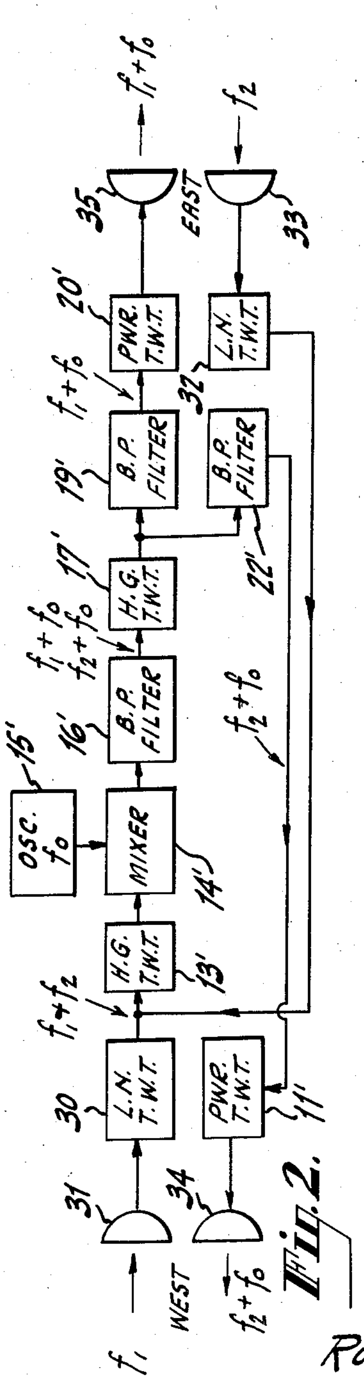
Figure 2 is a block diagram of another form of the invention.

Figure 2 shows a modified form of the invention, wherein separate antennas are used for transmitting and receiving. A low-noise traveling wave tube amplifier circuit 30 amplifies solely the signal received by directional receiving antenna 31 West. Similarly, a low-noise traveling wave tube amplifier circuit 32 amplifies solely the signal received by receiving directional antenna 33 East. The outputs of amplifiers 30 and 32 are both coupled to the amplifying and heterodyning chain of circuits, wherein the circuits corresponding to those in Figure 1 are given the same reference numerals, with prime designations added. The output of power traveling wave tube amplifier circuit 11′ is coupled solely to the transmitting directional antenna 34 West, and the power traveling wave tube amplifier 20′ is coupled solely to the directional transmitting antenna 35 East.

It is apparent that in the systems of Figures 1 and 2, the arrangement whereby the traveling wave tube amplifier circuits are used to amplify both the East-going signal and the West-going signal results in a very considerable economic saving. Traveling wave tubes are relatively complicated and expensive to manufacture. Therefore, any arrangement whereby the required number of traveling wave tubes is reduced, is of great commercial importance. According to this invention, the required number of traveling wave tubes is greatly reduced, and yet the performance of the system is maintained at a very high level. The advantages of the system accrue from the facts that the two signals which simultaneously pass thru a given common traveling wave tube amplifying circuit are at substantially the same level or amplitude, to thereby substantially reduce cross-modulation, and that the bandwidth characteristics of the traveling wave tubes are utilized to simultaneously amplify two message signals displaced in frequency.

What is claimed is:

1. In a radio relay station for simultaneously amplifying and relaying separate radio frequency signals of different frequencies and carrying different intelligences, means for feeding said signals of different intelligences through a common path including in cascade in the order named, at least one traveling wave tube amplifier circuit, a mixer, and a filter passing the sum frequencies from said mixer; a local oscillator, means for applying the output of said oscillator as heterodyning energy to said mixer, said oscillator having a frequency greater than the width of the frequency band occupied by said signals taken together, whereby said separate signals are heterodyned to signals of frequencies different from each other and not overlapping the frequencies of the original signals, a pair of filters each having an input coupled to the output of said first-named filter and operating to separate said different frequency heterodyned signals, and separate means coupled to the output of each of said last-named filters for relaying said different frequency heterodyned signals to other relay stations.

2. In a radio relay station for simultaneously amplifying and relaying separate radio frequency signals of different frequencies and carrying different intelligences, means for feeding said signals of different intelligences through a common path including in cascade in the order named, a first traveling wave tube amplifier circuit, a mixer, a filter passing the sum frequencies from said mixer, and a second traveling wave tube amplifier circuit; a local oscillator, means for applying the output of said oscillator as heterodyning energy to said mixer, said oscillator having a frequency greater than the width of the frequency band occupied by said signals taken together, whereby said separate signals are heterodyned to signals of frequencies different from each other and not overlapping the frequencies of the original signals, a pair of filters each having an input coupled to the output of said second traveling wave tube amplifier circuit and operating to separate said different frequency heterodyned signals, and separate means coupled to the output of each of said last-named filters for relaying said different frequency heterodyned signals to other relay stations.

References Cited in the file of this patent

UNITED STATES PATENTS

| | | |
|---|---|---|
| 1,502,812 | Espenschied | July 29, 1924 |
| 1,579,253 | Singer | Apr. 6, 1926 |
| 1,595,135 | Affel | Aug. 10, 1926 |
| 1,657,451 | Affel | Jan. 31, 1928 |
| 1,770,143 | Pickard | July 8, 1930 |
| 2,619,543 | Cutler | Nov. 25, 1952 |
| 2,674,692 | Cutler | Aug. 6, 1954 |
| 2,691,065 | Thompson | Oct. 5, 1954 |

FOREIGN PATENTS

| | | |
|---|---|---|
| 676,320 | Great Britain | July 23, 1952 |
| 684,693 | Great Britain | Dec. 24, 1952 |